United States Patent
Colosky

[15] 3,665,553
[45] May 30, 1972

[54] KEEL BONE EXTRACTOR FOR POULTRY PRODUCTS

[72] Inventor: George V. Colosky, Nampa, Idaho
[73] Assignee: Avi-Simplot, Inc., Nampa, Idaho
[22] Filed: Apr. 7, 1970
[21] Appl. No.: 26,378

[52] U.S. Cl. ............................................................. 17/11
[51] Int. Cl. ........................................................ A22c 21/00
[58] Field of Search ........................................ 17/11, 16, 46

[56] References Cited

UNITED STATES PATENTS 3,541,634 11/1970 Panek ..................................... 17/46
3,104,418 9/1963 Segur ..................................... 17/11
3,130,445 4/1964 Segur ..................................... 17/46

Primary Examiner—Lucie H. Laudenslager
Attorney—Jones and Lockwood

[57] ABSTRACT

This disclosure relates to a method and apparatus for breaking and extracting the keel bone from various types of dressed poultry carcasses. The apparatus includes an air cylinder having a pressure foot attached to the end of the air cylinder piston rod, and an anvil for supporting a poultry carcass. The anvil has a slot which is to be positioned under the keel bone of the carcass being processed. The pressure foot is used to force the keel bone into the anvil slot and cooperate with the side of the anvil to break the keel bone from the carcass. An extractor cup on the end of the anvil severs the keel bone from the carcass as the carcass is removed from the anvil.

1 Claim, 6 Drawing Figures

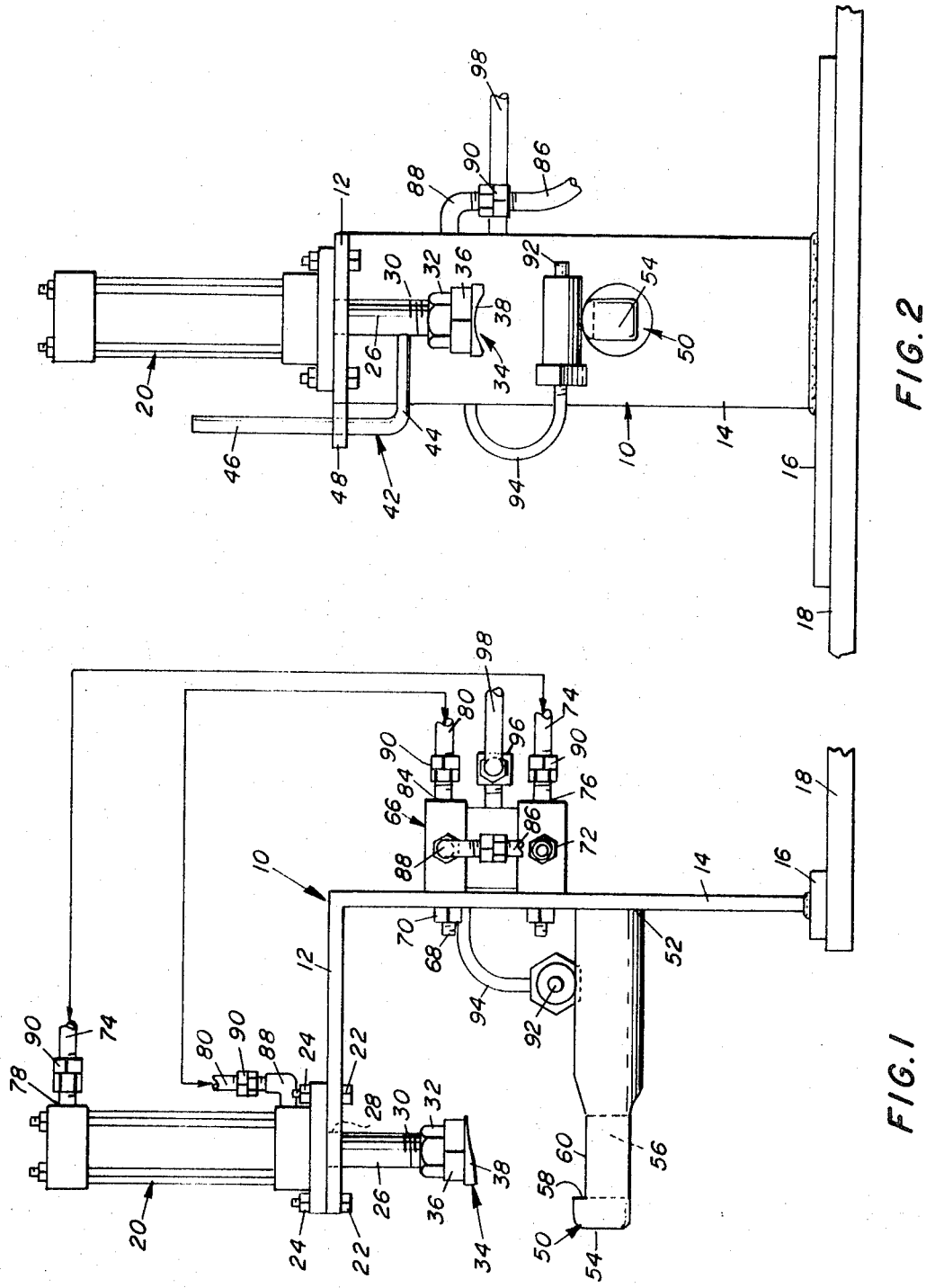

INVENTOR
GEORGE COLOSKY

KEEL BONE EXTRACTOR FOR POULTRY PRODUCTS

BACKGROUND OF THE INVENTION

This invention relates to a method and apparatus for removing the keel bone from a dressed poultry carcass such as a Rock Cornish Hen, chicken and the like.

In the preparation of poultry products for commercial use, it is now necessary for the producers or processors to accomplish all of the preparatory steps for cooking such as removing the head, feet, feathers, and internal organs before wholesaling to retailer or selling to consumers. Since consumer demand for poultry products which are easier to prepare has increased over the last few decades, it has been necessary for the poultry preparation and cleaning art to develop accordingly. Therefore, many of the processing operations previously performed by hand have been automated, and a multitude of devices have been developed for the purpose of cutting up the fowl, removing feathers or eviscerating the carcass. Until now, one of the most difficult jobs which has previously been performed by hand is the removal of the keel bone from the carcass of a fowl, and there is no device known in the prior art to perform this processing operation.

Generally, in the past the keel bone was not removed from the carcass when the work had to be done by hand because of the difficulty of the job and the time required. However, there were some exceptions to this general rule. For example, some of the more elegant restaurants removed the bones from the carcass prior to cooking the fowl so that the fowl could be carved more easily. Also, in preparing a small fowl such as a Rock Cornish Hen, for baking, it was necessary to remove the keel bone from the breast of the fowl so that the fowl could be eaten more easily and no meat would be wasted. Many processors have found that removing the keel bone produces a better product, and they have tried to develop some type of device for this purpose since removing the keel bone by hand is a very onerous and time-consuming chore. Another reason for developing a device for removing keel bones was the difficulty the processors encounter in finding adequate labor who would accept such a job at wages low enough to make the operation commercially feasible. Therefore, in order for the process of removing the keel bones to be commercially feasible, a need has existed for an inexpensive and easily operable device which can replace the large number of workers which would be, generally, necessary to perform keel bone extracting operations on an economical basis.

SUMMARY OF THE INVENTION

It is, therefore, an object of this invention to provide a quick and easy method of removing the keel bone from eatable fowls.

Another object of this invention is to provide an apparatus which will quickly and easily remove the keel bone from eatable fowls and which is inexpensive to manufacture and easy to operate.

Still another object of this invention is to provide a method and apparatus for performing a keel bone removal operation during the processing of poultry products which will reduce the personnel required to perform similar operations normally done by hand and which will increase the unit output volume per worker.

Still another object of this invention is to provide a keel bone removal apparatus which is efficient and which has a relatively low fatiguing effect on the operator when operated continuously during a working shift.

These and other objects are accomplished by the present invention through the use of an air cylinder which has a pressure foot attached to the piston rod of the air cylinder and a preformed anvil which supports a fowl being processed. The anvil has an aperture or slot therein which is, generally, the size of the keel bone that is to be extracted. When operating the device, a dressed carcass is placed on the anvil with the keel bone of the fowl positioned over the aperture in the anvil so that upon operation of the air cylinder, the pressure foot will engage the carcass and force the keel bone into the anvil slot. The air cylinder operates so that pressure is quickly applied and released, emulating a punching motion. This action breaks the keel bone loose from the carcass. A cup-shaped extractor portion of the anvil which is contiguous to the anvil slot will receive and sever the keel bone from the carcass as the carcass is removed from the anvil. The air cylinder is actuated by a gas supply which is controlled by an electrically operated pneumatic control valve that is activated by a switch at the will of the operator.

BRIEF DESCRIPTION OF THE DRAWINGS

The foregoing and additional objects, features and advantages of the invention will be apparent to those skilled in the art from the following detailed description of a preferred embodiment thereof, taken with the accompanying drawings, in which:

FIG. 1 is a side view of a keel bone extracting apparatus according to the present invention;

FIG. 2 is a front view of a keel bone extracting apparatus according to the present invention;

DESCRIPTION OF A PREFERRED EMBODIMENT

Figure 3:
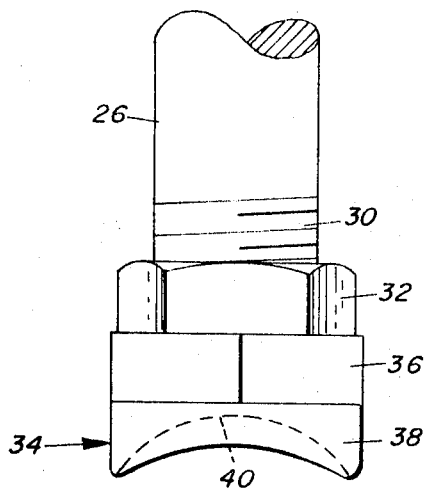
FIG. 3 is a front detail view of a pressure plate according to the invention.

Referring more particularly to the drawings, in FIG. 1, the numeral 10 illustrates a support frame or bracket made of any suitable material such as a ¼ × 2 inches stainless steel bar as shown in this preferred embodiment. The support frame 10 is formed in an L-shape having a horizontal leg 12 and a vertical leg 14. The vertical leg 14 is secured in any appropriate manner such as welding to a foot plate 16, and the foot plate 16 is in turn secured to a worktable 18 so that the horizontal leg 12 is above and parallel to the upper surface of the worktable and extends over the edge of the worktable.

Figure 4:
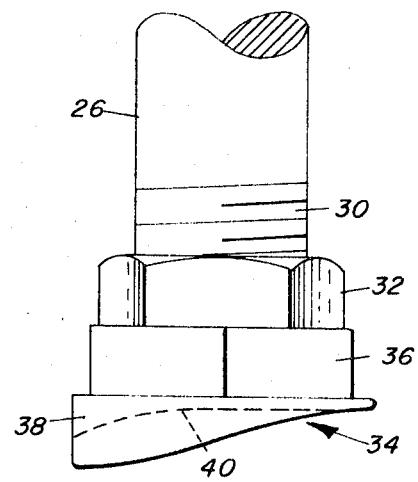
FIG. 4 is a side detail view of a pressure plate according to the invention.

The horizontal leg 12 carries an air cylinder 20 of any suitable type such as a "Modernair" air cylinder with a 1½ inch bore and a 3 inch piston stroke. The air cylinder 20 is secured to the horizontal leg 12 by bolts and nuts 22 and 24, respectively, and an air cylinder plunger or piston 26 extends downwardly through a hole 28 in the horizontal leg 12. The plunger 26, in this preferred embodiment, is threaded at the lower end 30 and carries a holding or locking nut 32 and a pressure foot assembly 34 which includes a threaded block 36 such as an ordinary nut and a pressure foot 38 fixedly secured to the block 36. Preferably, the pressure plate 38 is made of a ⅛ inch stainless steel plate which is surfaced with a ⅛ inch rubber coating. As shown in FIGS. 3 and 4, the pressure plate 38 has a concave lower surface 40 which will conform to the curvature and shape of the keel bone of the type of fowl being processed.

In order to keep the plunger 26 aligned in a proper position so that the pressure foot assembly will properly engage the keel bone, an L-shaped guide rod 42 (FIG. 2) having a horizontal portion 44 and a vertical portion 46 is provided. The horizontal portion 44 of the guide rod is fixedly secured to the plunger 26 in any suitable manner so that the vertical portion 46 of the rod extends upwardly through a lug 48 which is secured to the horizontal leg 12 of the support frame. The lug 48 permits the vertical leg 46 of the guide rod to move freely therethrough during the movement of the plunger 26 when the air cylinder 20 is operated.

In order to permit a variety of types of fowls to be processed, the pressure foot assembly 34 can be removed and replaced with other assemblies having different configurations corresponding to the type of fowl being processed. Proper alignment of the pressure foot assembly 34 is accomplished by screwing the pressure foot assembly on the plunger 26 until the concave surface of the foot is properly aligned with the fowl's keel bone and until the proper vertical alignment is attained to ensure that the pressure foot will descend to a proper height. Then, to ensure the pressure foot is maintained in the proper alignment, the holding block 32 is tightened into contact with the threaded block 36 of the pressure foot.

Figure 5:
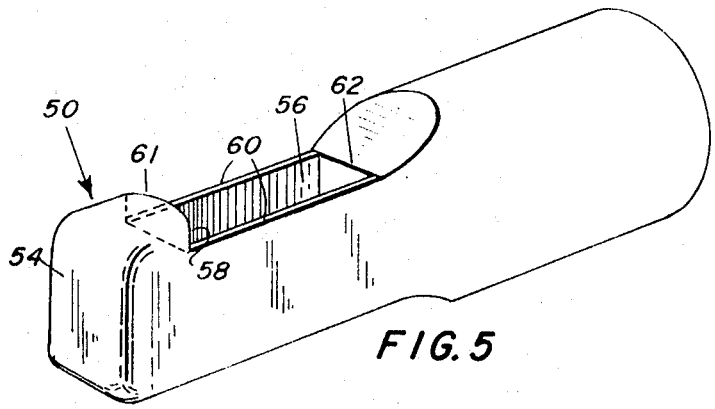
FIG. 5 is a perspective detail view of an anvil showing a configuration of the anvil detailing the extractor cup and the anvil slot.

During the operation of the extractor, the pressure foot assembly 34 is moved downwardly by the air cylinder to a position where it can cooperate with an anvil 50 to break the keel bone of the fowl being processed. In this described embodiment, the anvil is constructed of 1½ inch thin wall tubing, although any hollow member can be used. The end of the anvil 52 is secured to the vertical leg 14 of the frame 10. The anvil 50 is located a predetermined distance below and approximately parallel to the horizontal leg 12 so that it extends under the pressure foot assembly 34 carried by the air cylinder piston 26. The other end of the anvil is a cup-shaped extractor 54 that is secured to the elongated hollow tubing, as shown in FIG. 5. On the upper surface of the anvil 50, directly below the pressure foot 34, there is a passage cutout or slot 56 contiguous to the cup-shaped extractor which will permit the pressure foot 34 to extend into the general confines of the anvil. Shoulders 58 are formed by the side edges of the cup-shaped extractor 54, and the slot 56 is defined by the anvil side edges 60, cup end edge 61 and anvil end edge 62.

The extractor apparatus is very simple to operate, and the process of removing the keel bone begins by placing an eviscerated fowl on the anvil in a breast up position so that the anvil extends through the cavity of the bird from an abdominal opening to a neck opening. The keel bone of the fowl is placed over the slot 56. The pressure foot 34 is moved downwardly and contacts the fowl, exerting pressure on the breast portion and forcing the keel bone into the slot 56. The air cylinder is, generally, operated in such a manner that the pressure exerted on the carcass is quickly applied and released in a punching motion although this is not always the case. The pressure foot during its downward movement cooperates with the anvil side edges 60 to break the ribs and cartilage connected to the keel bone so that the keel bone is pushed into the slot 56. When the pressure foot is released and the fowl is removed from the anvil, the end of the keel bone will be caught in the extractor cup 54 so that it will be extracted or stripped from the breast of the carcass with the help of the cup end edge 61 and shoulders 58.

In order to break the keel bone away from the carcass, it has been found that a punching motion by the plunger of the air cylinder is best; therefore, in the described embodiment, an electrically activated pneumatic control valve 66 (FIGS. 1 and 6) is used to regulate surges of gas to and from the air cylinder. Any suitable quick action valve can be used. An example would be a "Skinner" electric valve rated at approximately 100 lbs. pressure. The valve 66 is secured to the vertical leg 14 of the frame on the side opposite the anvil by stud bolts 68 and nuts 70, but any appropriate securing means can be used.

Figure 6:
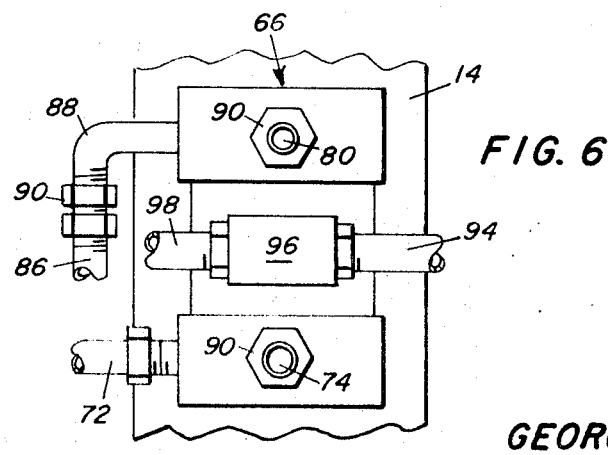
FIG. 6 is a detail view of a pneumatic control valve showing the pneumatic and electrical connections.

A pneumatic supply line (not shown) from a suitable source such as a compressor is connected to the valve at nipple fitting 72 (see FIG. 6). An inlet line 74 provides communication between the valve outlet 76 and an air cylinder inlet 78, and an outlet line 80 provides communication between an air cylinder outlet 82 and the valve return inlet 84. An exhaust line 86 is provided so that the pressurized gas can be exhausted at a point away from the apparatus, thus providing the operator with a safer place to work. All of the pneumatic lines are connected to their respective inlets and outlets by using any suitable fitting such as elbows 88 and straight swivel fittings 90.

The control valve 66 is activated by an electrical switch 92 which is mounted on the anvil 50 for convenience; however, the switch can be mounted at any location easily accessible to the operator in his normal working position. In this preferred embodiment, a push-button switch is used; however, any suitable activating means such as a push-push or toggle switch can be used. Since water is used in most processing operations to keep the carcasses clear, the switch 92 should be waterproof for safety. The switch can be mounted on the anvil in any suitable manner, for example, by welding a hollow pipe to the anvil and inserting the switch therein, or by a clamp.

Cable 94 connects the switch 92 to the valve 66 through a junction box 96, and a power cable 98 is routed to the valve and switch from a power source (not shown) through the junction box.

It can be seen from the above description and drawings that this invention provides a quick and easy method of removing the keel bone from eatable fowls. Also, the device can be operated by a single individual, thereby reducing the personnel required for processing which in turn reduces the labor costs. The apparatus automates an operation which was previously accomplished by hand, thereby saving time and increasing the unit output volume per worker. Another important feature of the device is its simplicity of design, which makes it inexpensive to manufacture.

The described embodiment can be modified in numerous ways, as will be apparent from the foregoing. For example, it is within the skill of the art to vary the anvil configuration or use a different type of switching arrangement such as a foot switch. These and other variations and changes can be made in the invention as above described and illustrated without departing from the true spirit and scope thereof as defined in the following claims.

I claim:

1. An apparatus for processing a small eviscerated fowl by breaking the keel bone from the carcass and removing the keel bone from the carcass cavity comprising:
   a. a support frame having a vertical leg and a horizontal leg secured to the upper end of said vertical leg;
   b. a pneumatic cylinder having a reciprocating plunger, said cylinder being carried on said horizontal leg so that said plunger reciprocates in a vertical direction;
   c. a pressure foot carried on said plunger, said pressure foot having a concave surface conforming generally to the shape of the keel bone of the carcass being processed;
   d. an anvil for supporting said carcass during processing and stripping said keel bone from the carcass as said carcass is removed from said anvil, said anvil being secured at one end to said vertical leg and being located below and parallel to said horizontal leg, the other end of said anvil having spaced, parallel side members which define a passage through said anvil below said reciprocating plunger, said anvil terminating in a cup-shaped portion secured to said side members, said cup-shaped portion having shoulders which extend above the upper edges of said side members, said pressure foot on said plunger being adapted to strike said carcass supported on said anvil and cooperate with the upper edges of said side members to break the ribs and cartilage attached to said keel bone and force said keel bone into said passage as said pressure foot is momentarily inserted into said passage when said plunger is reciprocated, said cup-shaped portion of said anvil engaging the keel bone upon removal of said carcass from said anvil, whereby said keel bone is stripped from said carcass and passes through said passage in said anvil;
   e. pneumatic control means for operating said pneumatic cylinder so that the pressure exerted on said carcass is quickly applied and released; and
   f. means for actuating said pneumatic control means.

* * * * *